United States Patent [19]

Zimmerman et al.

[11] Patent Number: 5,013,813

[45] Date of Patent: May 7, 1991

[54] POLYUREA ELASTOMER WITH RAPID DRY TIME

[75] Inventors: Robert L. Zimmerman, Austin; Dudley J. Primeaux, II, Elgin, both of Tex.

[73] Assignee: Texaco Chemical Company, White Plains, N.Y.

[21] Appl. No.: 452,158

[22] Filed: Dec. 18, 1989

[51] Int. Cl.$^5$ ............................................. C08G 18/32
[52] U.S. Cl. ...................................... 528/60; 528/61; 528/68; 528/75; 528/76
[58] Field of Search ....................... 528/60, 61, 68, 75, 528/76

[56] References Cited

U.S. PATENT DOCUMENTS 4,806,615  2/1989  Rico et al. ............................ 528/68

*Primary Examiner*—Maurice J. Welsh
*Attorney, Agent, or Firm*—Robert A. Kulason; James J. O'Loughlin; Dominick G. Vicari

[57] ABSTRACT

A polyurea elastomer which exhibits a rapid dry time is disclosed. The elastomer includes an isocyanate, an amine terminated polytetrahydrofuran and a chain extender. The isocyanate is preferably a quasi-prepolymer of an isocyanate and a material selected from at least one polyol, a high molecular weight polyoxyalkyleneamine or a combination thereof.

16 Claims, No Drawings

POLYUREA ELASTOMER WITH RAPID DRY TIME

This application is related to application Ser. No. 452,146 filed Dec. 18, 1989.

BACKGROUND OF THE INVENTION

1. Field of the Invention

The present invention relates generally to polyurea elastomers and, more specifically, to spray and reaction injection molded polyurea elastomers which exhibit a rapid dry time.

2. Description of Background Art

Elastomer systems are commonly recognized as, among other things, coating materials, with spray polyurea elastomer systems being particularly useful when employed in this capacity; rooftops and floorings are particularly well suited substrates. In addition to coating applications, spray polyurea elastomers are also employed in other open mold spraying applications for part production. Polyurea elastomers are also used for part production in closed mold applications, such as reaction injection molding (RIM) and reinforced reaction injection molding (RRIM).

In the case of part production, whether it be via open mold spraying, RIM or RRIM, one of the considerations confronting the skilled artisan is the dry time of the elastomer, i.e., the time it takes the molded part to dry. Specifically, a molded part fabricated from a polyurea elastomer which exhibits a slow dry time prohibits the worker from handling the molded work piece until it dries. A slow dry time will also upset the storage capability of the molded parts since, if they are stacked when they have not yet dried, the molded parts will invariably stick together. The resulting decrease in productivity becomes particularly problematic when molded parts are being produced and stored on a commercial level.

Similarly, in the case of coated substrates, such as floors and rooftops, a slow dry time prevents the coated surface from being walked on without resulting in surface defects, i.e., sticking, tracking, scratches, etc. Surface defects can also occur if the wet coating becomes exposed to adverse environmental elements.

In accordance with the present invention, the dry time of a polyurea elastomer is substantially reduced, thereby overcoming those shortcomings identified hereinabove.

U.S. Pat. No. 3,666,788 is directed to cyanoalkylated polyoxyalkylene polyamines which are specifically described as being useful as curing agents in polyurea coatings. Similarly, U.S. Pat. No. 3,714,128 describes cyanoalkylated polyoxyalkylene polyamines which are useful for slowing the gelling or hardening of the polyurea component so that good mixing of the isocyanate and amine components can be attained, which gives the sprayed material ample time to adhere and level before gelation of the polyurea coating occurs.

U.S. Pat. No. 3,979,364 describes the use of aminated polyethers as hereinafter used as a component with a polyol to make an elastomer.

U.S. Pat. Nos. 4,379,729; 4,444,910 and 4,433,067 describe elastomers which are prepared using a high molecular weight amine terminated polyether, an aromatic diamine chain extender and an aromatic polyisocyanate which may merely be polyisocyanate or a quasi-prepolymer prepared from a polyol reacted with a polyisocyanate wherein some isocyanate groups are still left unreacted. Various patents have been applied for and received using the basic combination recited above as well as various mold release agents and other additives, such as catalysts and fillers, including glass fibers. For example, see U.S. Pat. No. 4,607,090.

U.S. Pat. No. 4,585,850 describes a reaction injection molded (RIM) elastomer made by reacting, in a closed mold, an amine terminated polyether of greater than 1500 average molecular weight, having greater than 50 percent of their active hydrogens in the form of amine hydrogens; a chain extender; flaked glass pretreated with an amino silane coupling agent; and an aromatic polyisocyanate. The '850 patent referred to above contains a discussion of other applications and patents in the field; for example, U.S. Pat. Nos. 4,474,900 and 4,507,090.

U.S. Pat. No. 4,714,778 describes certain alkenylated toluene diamines which are reported as being useful as triand tetrafunctional chain extenders for forming polyurethane-urea elastomers.

U.S. Pat. No. 4,816,543 describes a monotertiary-alkyltoluene diamine which is reported as being useful as a chain extending agent for the formation of polyurethane-urea elastomers. At least 50 percent of the equivalent weight of the chain extending agent is mono-tertiary-butyltoluene diamine.

U.S. Pat. No. 4,806,615 describes reaction injection molded (RIM) elastomers consisting of a cured reaction product of primary or secondary amine terminated polyethers of greater than 1500 molecular weight, an aromatic polyisocyanate, a combination of a unsubstituted aromatic diamine chain extender and a substituted acyclic aliphatic diamine chain extender.

U.S. Pat. No. 4,218,543 describes the use of high molecular weight polyols, certain aromatic diamines and isocyanates for the production of RIM parts. This patent specifically claims as a chain extender 1-methyl-3,5-diethyl2,4-diaminobenzene (diethyltoluenediamine) and its isomer.

U.S. Pat. No. 4,523,004 discloses a substituted aromatic diamine chain extender in a RIM product.

U.S. Pat. No. 4,631,298 discloses blending various slower reacting chain extenders with diethyltoluene diamine in a RIM system using amine terminated polyethers.

Thus, it is our understanding that a polyurea elastomer which exhibits a rapid dry time as exhibited by the elastomer of the present invention has heretofore been unavailable.

SUMMARY OF THE INVENTION

Accordingly, the present invention relates to a polyurea elastomer which comprises an (A) component and a (B) component. The (A) component includes an isocyanate. Preferably, the isocyanate of component (A) includes a quasi-prepolymer of an isocyanate and a material selected from at least one polyol, a high molecular weight polyoxyalkyleneamine or a combination of these materials. The (B) component includes (1) an amine terminated polytetrahydrofuran and (2) a chain extender.

Advantageously, the polyurea elastomer of the present invention, due to the inclusion of the polytetrahydrofuran component, exhibits a rapid dry time relative to polyurea elastomers which are devoid of such component. Thus, a molded part fabricated from the polyurea elastomer of the present invention can be handled and stored sooner than those fabricated from known polyurea elastomers, resulting in enhanced productivity. Also, since the rapid dry time provides an initial toughness (green strength), a substrate that is coated with the present polyurea elastomer can be walked on and exposed to adverse environmental elements sooner, resulting in the substantial elimination of surface defects.

DESCRIPTION OF THE PREFERRED EMBODIMENTS

The isocyanates employed in component (A) are those known to one skilled in the art. Thus, for instance, they can include aliphatic isocyanates of the type described in U.S. Pat. No. 4,748,192. Accordingly, they are typically aliphatic diisocyanates and, more particularly, are the trimerized or the biuretic form of an aliphatic diisocyanate, such as hexamethylene diisocyanate, or the bifunctional monomer of the tetraalkyl xylene diisocyanate, such as the tetramethyl xylene diisocyanate. Cyclohexane diisocyanate is also to be considered a preferred aliphatic isocyanate. Other useful aliphatic polyisocyanates are described in U.S. Pat. No. 4,705,814. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3 and 1,4-cyclohexane diisocyanate as well as any desired mixture of these isomers, 1-isocyanato-3,3,5-trimethyl5-isocyanatomethylcyclohexane (isophorone diisocyanate); 4,4'-.2,2'-and 2,4'-dicyclohexylmethane diisocyanate as well as the corresponding isomer mixtures, and the like.

A wide variety of aromatic polyisocyanates may be used to form the elastomer of the present invention. Typical aromatic polyisocyanates include p-phenylene diisocyanate, polymethylene polyphenylisocyanate, 2,6-toluene diisocyanate, dianisidine diisocyanate, bitolylene diisocyanate, naphthalene1,4-diisocyanate, bis(4-isocyanatophenyl)methane, bis(3-methyl-3-iso-cyanatophenyl)methane, bis(3-methyl-4isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to about 100 weight percent diphenyldiisocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979.

By far the most preferred aromatic polyisocyanate is methylene bis(4-phenylisocyanate) or MDI. Pure MDI, quasi-prepolymers of MDI, modified pure MDI, etc. are useful. Materials of this type may be used to prepare suitable RIM elastomers. Since pure MDI is a solid and, thus, often inconvenient to use, liquid products based on MDI or methylene bis(4-phenylisocyanate) are used herein. U.S. Pat. No. 3,394,164 describes a liquid MDI product. More generally, uretonimine modified pure MDI is included also. This product is made by heating pure distilled MDI in the presence of a catalyst. The liquid product is a mixture of pure MDI and modified MDI and is represented as follows:

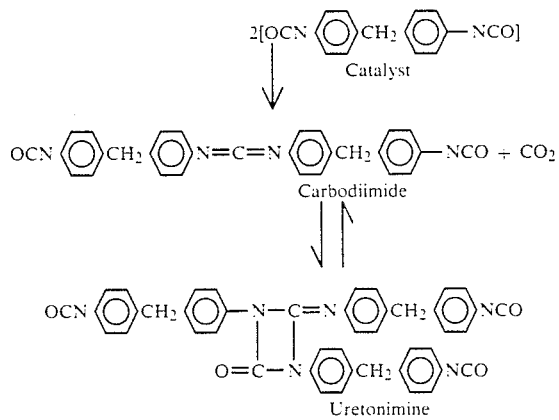

Examples of commercial materials of this type are Dow's ISONATE® 125M (pure MDI) and ISONATE 143L ("liquid" MDI). Preferably the amount of isOcyanates used is the stoichiometric amount based on all the ingredients in the formulation or greater than the stoichiometric amount.

Of course, the term isocyanate also includes quasi-prepolymers of isocyanates or polyisocyanates with active hydrogen containing materials. The active hydrogen containing materials of component (A) can include, but are not limited to, a polyol or polyols, a high molecular weight polyoxyalkyleneamine or combinations thereof.

The polyols include polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. Other high molecular weight polyols which may useful in this invention are polyesters of hydroxyl terminated rubbers, e.g., hydroxyl terminated polybutadiene. Hydroxyl terminated quasi-prepolymers of polyols and isocyanates are also useful in this invention.

Especially preferred are amine terminated polyether polyols, including primary and secondary amine terminated polyether polyols of greater than 1,500 average molecular weight having from about 2 to about 6 functionality, preferably from about 2 to about 3, and an amine equivalent weight of from about 750 to about 4,000. Mixtures of amine terminated polyethers may be used. In a preferred embodiment the amine terminated polyethers have an average molecular weight of at least about 2,500. These materials may be made by various methods known in the art.

The amine terminated polyether resins useful in this invention, for example, are polyether resins made from an appropriate initiator to which lower alkylene oxides, such as ethylene oxide, propylene oxide, butylene oxide or mixtures thereof, are added with the resulting hydroxyl terminated polyol then being aminated.

When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which is incorporated herein by reference.

In the practice of this invention, a single high molecular weight amine terminated polyol may be used. Also, mixtures of high molecular weight amine terminated polyols, such as mixtures of di-and trifunctional materials and/or different molecular weight or different chemical composition materials, may be used.

Also, high molecular weight amine terminated polyethers or simply polyether amines may be included in component (A) and may be used alone or in combination with the aforestated polyols. The term high molecular weight is intended to include polyether amines having a molecular weight of at least about 2000. Particularly preferred are the JEFFAMINE ® series of polyether amines available from Texaco Chemical Company; they include JEFFAMINE D-2000, JEFFAMINE D-4000, JEFFAMINE T-3000 and JEFFAMINE T-5000. These polyether amines are described with particularity in Texaco Chemical Company's product brochure entitled THE JEFFAMINE POLYOXYALKYLENEAMINES.

The (B) component of the present polyurea elastomer system includes an amine terminated polytetrahydrofuran and a chain extender. The amine terminated polytetrahydrofuran of component (B) can be prepared in any known manner. Generally, a polytetrahydrofuran polyol can be directly aminated to produce an amine terminated polytetrahydrofuran represented by the formula:

$$H_2N(CH_2CH_2CH_2CH_2O)_xCH_2CH_2CH_2CH_2NH_2$$

where X is an integer from 2 to 75. Alternatively, acrylonitrile can be added to a polytetrahydrofuran polyol to produce an acrylonitrile adduct and then the adduct can be reduced to produce an amine terminated polytetrahydrofuran represented by the formula:

$$H_2NCH_2CH_2CH_2(OCH_2CH_2CH_2CH_2)_yOCH_2CH_2CH_2NH_2$$

where y is an integer from 1 to 75. The reduction of the acrylonitrile adduct is preferably conducted in a hydrogen atmosphere in the presence of a reduction catalyst, such as cobalt, at a temperature of about 100° C. and a pressure of about 1000 psi. The foregoing reduction conditions and parameters are offered to illustrate a preferred embodiment; other suitable conditions and parameters are known to those skilled in the art. The molecular weight of the amine terminated polytetrahydrofuran is about 200 to about 5000.

One particularly preferred way of preparing the polytetrahydrofuran is by reacting a polyol with ammonia in a hydrogen atmosphere and in the presence of a nickel—copper—chromium —molybdenum catalyst at a temperature of about 170° C. This reaction can be performed, for instance, by passing the polyol, ammonia and hydrogen through a tubular reactor which contains the catalyst. The crude reaction product is then stripped to remove the ammonia and water to produce the amine terminated polytetrahydrofuran. The polyols used to prepare the amine terminated polytetrahydrofuran can be selected from polytetrahydrofuran polyols having a molecular weight of about 250 to about 5000. One particularly preferred polyol is polytetramethyleneglycol. Higher molecular weight polytetrahydrofurans can be prepared in accordance with the teachings of U.S. Pat. No. 4,833,213, the contents of which are incorporated herein by reference.

A particularly preferred amine terminated polytetrahydrofuran is commercially available from BASF Aktiengesellschaft, as Polytetrahydrofurandiamine 5200. Closely related materials which may also be used to produce the present polyurea elastomer are bis(3-aminopropyl) polytetrahydrofuran 350, 750, 1100 and 2100, which are also available from BASF Aktiengesellschaft. Generally, the aforedescribed closely related materials are made via the alternative method described above; specifically, by adding acrylonitrile to a polytetrahydrofuran and then reducing the nitrile to an amine. For purposes of this description and the claims which follow, the terminology polytetrahydrofuran and amine terminated polytetrahydrofuran are intended to include, among other things, the aforedescribed closely related materials.

By incorporating the polytetrahydrofuran into the present polyurea elastomer an accelerated rate of reaction is observed which results in the characteristic rapid dry time. The accelerated rate of reaction is ascribed to the fact that polymer molecular weight is built faster on the surface of the elastomer as the reaction proceeds.

The chain extenders useful in this invention include, for example, 1-methyl-3,5-diethyl-2,4-diaminobenzene, 5-methyl-3,5-diethyl-2,6-diaminobenzene (both of these materials are also called diethyltoluene diamine or DETDA and are commercially available as ETHACURE 100 from the Ethyl Corporation, Baton Rouge, LA), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. It is within the scope of this invention to include some aliphatic chain extender materials as described in U.S. Pat. Nos. 4,246,363 and 4,269,945.

Other chain extenders include di(methylthio)-toluene diamine or N,N'-bis(t-butyl) ethylenediamine, each of which can be used alone or, preferably, in combination with 1-methyl-3,5-diethyl- 2,4-diaminobenzene or 1-methyl-3,5-diethyl-2,6-diaminobenzene. The aforestated combination includes from about 20 to about 99 parts of di(methylthio)-toluene diamine or N,N'-bis(t-butyl) ethylenediamine to about 80 to about 1 parts of DETDA.

One particularly preferred form of the di(methylthio)toluene diamine component of the chain extender is as Ethacure ® 300, a product of Ethyl Corporation. Specifically, Ethacure 300 is a 4:1 blend of 3,5-di(methylthio)-2,4-toluene diamine and 3,5 di(methylthio)-2,6-toluene diamine, respectively. The N,N'-bis(t-butyl) ethylenediamine component is commercially available from Virginia Chemicals, Portsmouth, Va.

Other chain extenders include amine terminated chain extenders which are generally described as low molecular weight poly-oxyalkylene polyamines containing terminal amine groups. One particular chain extender is represented by the formula:

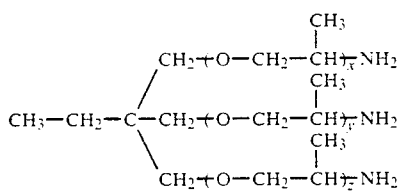

wherein x+y+z has a value of up to about 6.3. The average molecular weight is up to about 500 and the product is commercially available from Texaco Chemical Company as JEFFA-MINE T-403.

Another related polyoxypropylene chain extender is represented by the formula:

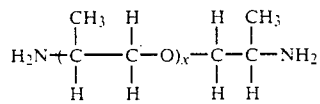

wherein x has a value of up to about 8.3. This product has an average molecular weight of up to about 500 and is commercially available from Texaco Chemical Company as JEFFAMINE D-400. The product having the same formula as above wherein x has an average value of up to about 4.9 is useful. This product has an average molecular weight of up to about 300 and is commercially available from Texaco Chemical Company as JEFFAMINE D-230.

Other chain extenders will be apparent to those skilled in the art and the above recitation is not intended to be a limitation on the invention claimed herein.

Optionally, the present polyurea elastomer can include an internal mold release agent to facilitate the removal of the cured elastomer from the open or closed mold. While the release agent, if employed, can be incorporated into the (A) or (B) component, it is preferably incorporated in the (B) component. The internal mold release agents useful in the present invention are known to those skilled in the art; they include, but are not limited to, zinc stearate, sodium oleate and silicone agents.

Advantageously, the (A) and (B) components react to form the present elastomer system without the aid of a catalyst.

Other conventional formulation ingredients may be employed in component (A) or (B) as needed, such as, for example, foam stabilizers, also known as silicone oils or emulsifiers. The foam stabilizers may be an organic silane or siloxane. For example, compounds may be used having the formula:

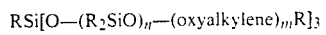

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Pigments, for example titanium dioxide, may be incorporated in the elastomer system, preferably in the (B) component, to impart color properties to the elastomer. Similarly, filler materials may also be included in the present polyurea elastomer.

Post curing of the elastomer of the invention is optional. Post curing will improve some elastomeric properties, such as heat sag. Employment of post curing depends on the desired properties of the end product.

The (A) component and (B) component of the present polyurea elastomer system are combined or mixed under high pressure; most preferably, they are impingement mixed directly in the high pressure equipment, which is, for example, a GUSMER ® H-V proportioner fitted with a GUSMER Model GX-7 spray gun where open mold work or coating is desired or, where closed mold work is desired (e.g., RIM or RRIM), the proportioner can be fitted with standard RIM or RRIM equipment. In particular, a first and second pressurized stream of components (A) and (B), respectively, are delivered from two separate chambers of the proportioner and are impacted or impinged upon each other at high velocity to effectuate an intimate mixing of the two components and, thus, the formation of the elastomer system, which is then delivered onto or into the desired substrate via the spray gun or RIM equipment. If desired, the present polyurea elastomer can be used for pour gun work, such as electrical potting work, and when used in this capacity, the high pressure equipment can be fitted, for example, with a GUSMER ARC pour gun.

The volumetric ratio of the (A) component to the (B) component is generally from about 30 to 70 percent to about 70 to 30 percent.

GLOSSARY OF TERMS AND MATERIALS

TEXOX ® PPG-2000 - Polypropylene oxide of about 2000 molecular weight; a product of Texaco Chemical Company.

ISONATE ® 143 L - Carbodiimide modified liquid MDI; a product of the Upjohn Company.

JEFFAMINE ® T-5000 - Polypropylene oxide triamine of about 5000 molecular weight; a product of Texaco Chemical Company.

JEFFAMINE ® D-2000 - Polypropylene oxide diamine of about 2000 molecular weight; a product of Texaco Chemical Company.

The following examples are provided to further illustrate preferred embodiments of the present invention and should not be construed as limiting the present invention in any way.

In the examples, all spray work was performed with a GUSMER® H-V high pressure proportioner fitted with a GUSMER model GX-7 spray gun. The elastomer systems were sprayed using a block temperature of 160° F. on the (A) component side and 150° F. on the (B) component side, with a hose temperature of 160° F. The system output was 18.75 lbs/min with a line pressure ranging from 2400 to 2800 psi on the (A) component side and 1500 to 2000 psi on the (B) component side at a hydraulic pressure of 500 psi. The amine terminated polytetrahydrofuran component used in Examples II and III is an aminated polytetrahyrofuran polyol of about 1000 molecular weight having a primary amine value of 1.72 meq./g, a total amine value of 1.83 meq./g and a total acetylatables value of 1.92 meq./g.

EXAMPLE I

The (A) component of a spray polyurea elastomer was prepared by combining 60 parts of ISONATE 143L and 40 parts of TEXOX PPG-2000 to form a quasi-prepolymer. The (B) component was prepared by combining 41.4 parts of JEFFAMINE T-5000, 27.6 parts of JEFFAMINE D-2000, and 31.0 parts of DETDA. The (A) and (B) components were mixed in the high pressure spray equipment at an (A):(B) weight ratio of 1.118 and a volumetric ratio of 0.997. The resulting polyurea elastomer was sprayed onto a flat metal substrate coated with a zinc stearate based external mold release agent and exhibited a gel time of 1.8 seconds.

EXAMPLE II

The (A) component of the polyurea elastomer produced in this example was prepared in accordance with Example I. The (B) component was prepared by combining 42.1 parts of JEFFAMINE T-5000, 14.05 parts of JEFFAMINE D-2000, 14.05 parts of an amine terminated polytetrahydrofuran and 29.8 parts of DETDA. The (A) and (B) components were mixed in the high pressure spray equipment at an (A):(B) weight ratio of 1.117 and a volumetric ratio of 0.993. The resulting polyurea elastomer was sprayed in accordance with Example I. The gel time was 1.7 seconds.

EXAMPLE III

The (A) component of the polyurea elastomer produced in this example was prepared in accordance with Example I. The (B) component was prepared by combining 42.5 parts of JEFFAMINE T-5000, 28.3 parts of an amine terminated polytetrahydrofuran and 29.2 parts of DETDA. The (A) and (B) components were mixed in the high pressure spray equipment at an (A):(B) weight ratio of 1.133 and a volumetric ratio of 1.005. The resulting polyurea elastomer was sprayed in accordance with Example I. The gel time was 1.5 seconds.

The physical properties of the polyurea elastomers produced in Examples I–III were analyzed; the results as well as the respective dry times are reported in Table I.

TABLE I

| | EXAMPLE | | |
|---|---|---|---|
| | I | II | III |
| Dry time (secs) | 8 | <5 | <5 |
| Elastomer Physical Properties | | | |
| Avg. thickness (in) | 0.064 | 0.075 | 0.072 |
| Tensile strength (psi) | 2471 | 2440 | 2447 |
| Elongation (%) | 162 | 167 | 162 |
| Tear (pli) | 465 | 473 | 487 |
| Shore D Hardness | | | |
| (0 sec) | 56 | 58 | 54 |
| (10 sec) | 48 | 51 | 48 |
| Flexural modulus (psi) | | | |
| 77° F. | 41320 | 41270 | 39220 |
| 158° F. | 29250 | 27875 | 29305 |
| −20° F. | 92130 | 83930 | 92360 |
| Impact, notched | | | |
| (ft-lbs/in) | 3.80 | 3.25 | 3.95 |

As these data demonstrate, the polyurea elastomer of the present invention, which includes the amine terminated polytetrahydrofuran (Examples II and III) exhibits a dry time that is at least about 38 percent better than that exhibited by a polyurea elastomer that is devoid of the amine terminated polytetrahydrofuran (Example I).

What is claimed is:

1. A polyurea elastomer comprising an (A) component which includes an isocyanate and a (B) component which includes (1) an amine terminated polytetrahydrofuran and (2) a chain extender.

2. The elastomer of claim 1 wherein said amine terminated polytetrahydrofuran is selected from a compound represented by the formula: (i) $H_2N(CH_2CH_2CH_2CH_2O)_xCH_2CH_2CH_2CH_2NH_2$, where x is an integer from 2 to 75; or (ii) $H_2NCH_2CH_2CH_2(OCH_2CH_2CH_2CH_2)_yCH_2CH_2CH_2NH_2$, where y is an integer from 1 to 75.

3. The elastomer of claim 1 wherein said amine terminated polytetrahydrofuran has a molecular weight of about 200 to about 5000.

4. The elastomer of claim 1 wherein said isocyanate of component (A) comprises a quasi-prepolymer of said isocyanate and a material selected from at least one polyol, a high molecular weight polyoxyalkyleneamine or a combination of said materials.

5. The elastomer of claim 7 wherein said at least one polyol of said quasi-prepolymer comprises polyether polyols or polyester polyols having an equivalent weight of at least about 500.

6. The elastomer of claim 5 wherein said polyester polyols are polyesters of hydroxyl terminated rubbers.

7. The elastomer of claim 5 wherein said polyether polyols are selected from the group consisting of polyols based on trihydric initiators and having a molecular weight of at least about 4000; amine terminated polyether polyols having an average molecular weight greater than 1500, a functionality of from about 2 to about 6 and an amine equivalent weight of from about 750 to about 4000; and mixtures thereof.

8. The elastomer of claim 7 wherein the functionality of said polyether polyols is from about 2 to about 3.

9. The elastomer of claim 5 wherein said polyether polyols are derived from amine terminated polyether resins having greater than 50 percent of their active hydrogens in the form of amine hydrogens.

10. The elastomer of claim 1 wherein said chain extender is selected from a compound represented by the formula:

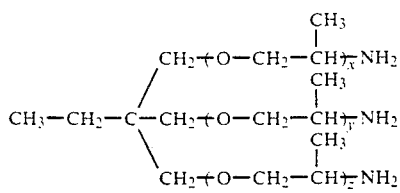

wherein x+y+z has a value of up to about 6.3 and wherein the average molecular weight is up to about 500;

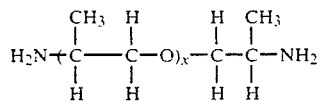

wherein x has a value of up to about 8.3 and wherein the average molecular weight is up to about 500;

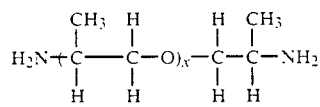

wherein x has a value of up to about 4.9 and wherein the average molecular weight is up to about 300; or (iv) a combination of at least two of compounds (i), (ii) and (iii).

11. The elastomer of claim 1 wherein said chain extender is selected from the group consisting of 1-methyl-3,5-diethyl2,4-diaminobenzene; 1-methyl-3,5-diethyl-2,6-diaminobenzene; a mixture of 1-methyl-3,5-diethyl-2,4-diaminobenzene and 1-methyl-3,5 diethyl-2,6-diaminobenzene; di(methylthio)-toluene diamine; N',N-bis(t-butyl) ethylene diamine; 1,3,5-triethyl2,6-diaminobenzene; and 3,5,3',5'-tetraethyl-4,4'-diaminodiphenylmethane.

12. The elastomer of claim 1 wherein the volumetric ratio of the (A) component to the (B) component is from about 30 to about 70 percent of the (A) component to about 70 to about 30 percent of the (B) component.

13. The elastomer of claim 1 further comprising an internal mold release agent.

14. A polyurea elastomer comprising an (A) component which includes a quasi-prepolymer of an isocyanate and a material selected from at least one polyol, a high molecular weight polyoxyalkyleneamine or a combination of said materials; and a (B) component which includes (1) an amine terminated polytetra-hydrofuran selected from a compound represented by the formula:

(i) $H_2N(CH_2CH_2CH_2O)_xCH_2CH_2CH_2CH_2NH_2$.

where X is an integer from 2 to 75 or (ii)

$H_2NCH_2CH_2CH_2(OCH_2CH_2CH_2)_yOCH_2CH_2CH_2NH_2$, where y is an integer from 1 to 75, and (2) a chain extender.

15. The elastomer of claim 14 wherein said amine terminated polytetrahydrofuran has a molecular weight, of about 200 to about 5000.

16. The elastomer of claim 14 wherein said chain extender is selected from the group consisting of:
(i) 1-methyl-3,5-diethyl-2,4-diaminobenzene; (ii) 1-methyl 3,5-diethyl-2,6-diaminobenzene; (iii) a mixture of 1-methyl-3,5-diethyl-2,4-diaminobenzene and 1-methyl3,5-diethyl2,6-diaminobenzene; (iv) di(methylthio)toluene diamine; (v) N,N'bis(t-butyl) ethylenediamine; (vi) 1,3,5-triethyl-2,6-diaminobenzene; (viii) 3,5,3',5'-tetraethyl-4,4'diaminodiphenylmethane;

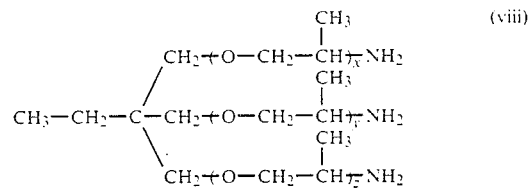

wherein x+y+z has a value of up to about 6.3 and wherein the average molecular weight is about 500;

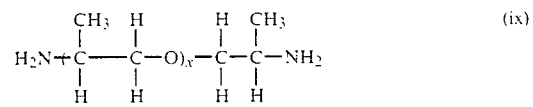

wherein x has a value of up to about 8.3 and wherein the average molecular weight is up to about 500;

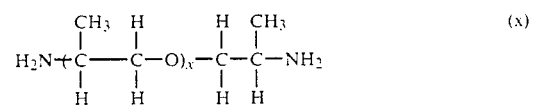

wherein x has a value of up to about 4.9 and wherein the average molecular weight is up to about 300; or
(xi) a combination of at least two of compounds (i)-(x).

* * * * *

UNITED STATES PATENT AND TRADEMARK OFFICE
CERTIFICATE OF CORRECTION

PATENT NO. : 5,013,813

DATED : May 7, 1991

INVENTOR(S) : Robert L. Zimmerman, et al.

It is certified that error appears in the above-identified patent and that said Letters Patent is hereby corrected as shown below:

<u>Col. 10, line 34</u>, "2)$_y$CH$_2$CH$_2$CH$_2$NH$_2$, should read --2)$_y$OCH$_2$CH$_2$CH$_2$NH$_2$,--.

Signed and Sealed this

Sixteenth Day of February, 1993

Attest:

STEPHEN G. KUNIN

*Attesting Officer*  *Acting Commissioner of Patents and Trademarks*